United States Patent Office 3,091,479
Patented May 28, 1963

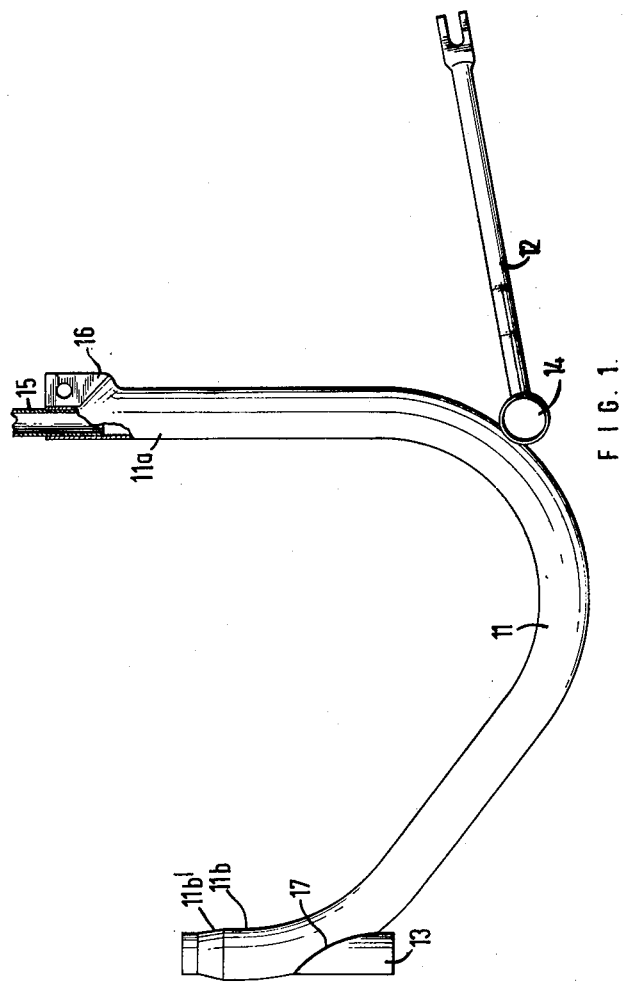

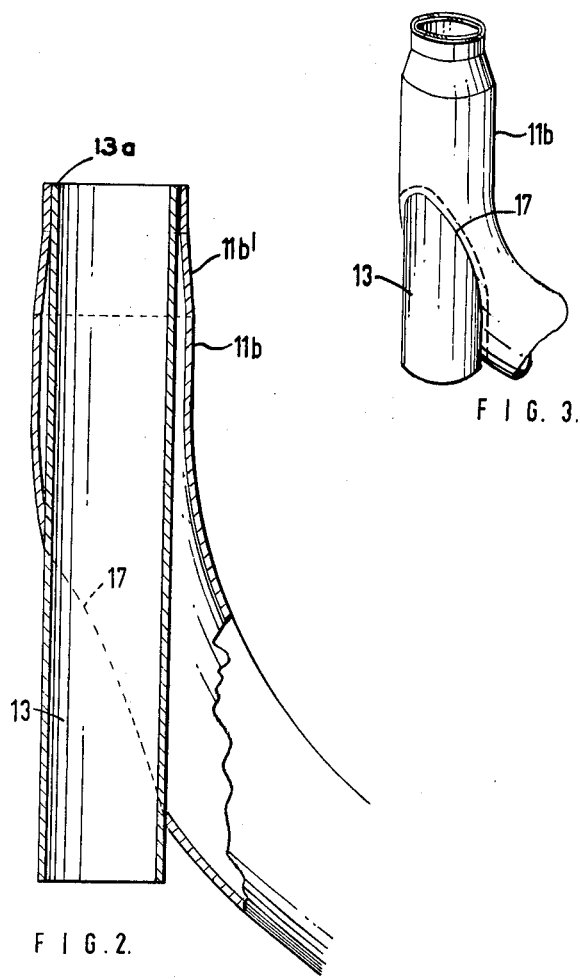

3,091,479
CYCLE FRAMES
Alan P. Oakley, Bramcote, England, assignor to The Raleigh Cycle Co. Limited, a corporation of Great Britain
Filed Sept. 16, 1960, Ser. No. 56,494
Claims priority, application Great Britain Sept. 22, 1959
4 Claims. (Cl. 280—281)

The invention relates to bicycle and tricycle frames.

During the production of a bicycle or tricycle it is a common practice to join one tubular element to another by the use of lugs, the tubular elements being secured to the lugs by brazing.

In the manufacture of a bicycle or tricycle, it is not unusual to secure one element radially of another, as for example in a T-joint, by shaping the end of one element to a form complementary to the part of the element to which it is to be secured and brazing or welding the elements together. For strength requirements it is frequently necessary to provide webs in the angles between the jointed elements.

It is particularly important that the joint between the head tube and adjacent elements has adequate strength to meet the stress as applied thereto during use.

It is among the objects of the present invention to provide a simplified frame construction which will possess adequate strength and which will be produced by fewer manufacturing operations than has hitherto been necessary.

According to the present invention a tubular frame for a bicycle, tricycle or the like comprises a suitably shaped main frame element adapted to receive, in substantially coaxial relationship with an appropriate part thereof, one or more additional frame elements such as, for example, a head tube; the said elements being as formed at such part that one penetrates the wall of the other and so that the additional element or elements is, or are, adapted to be secured to the main element.

The invention includes the method of joining elements of a tubular frame consisting in the steps of forming at least one of the elements with a bend, piercing the wall of such element at the bend to form an aperture to receive the other element, inserting the said other element through said aperture and into mutual coaxial relation therewith at some part and then securing the elements in such position.

The invention will now be described further, by way of example only, with reference to the accompanying drawings illustrating one particular embodiment thereof and in which:

FIG. 1 is a side elevation of a cycle frame assembly;

FIG. 2 is an enlarged cross sectional view of part of FIG. 1; and

FIG. 3 is a front perspective view of part of the frame shown in FIG. 1.

Referring now to the drawings a bicycle frame assembly constructed in accordance with the present invention consists of a main frame element 11 having secured thereto a fork arrangement 12 whereby a rear wheel may be supported and being adapted to support a front fork (not shown) by the acceptance of a head tube 13 for said fork in coaxial relationship therewith.

The main frame element 11 is of one piece of tubing and so shaped as to form a distorted U-shaped member.

The lower part of the U-shaped member is adapted to receive a conventional bottom bracket arrangement (not shown) and has welded thereto attachment means 14 for the rear fork arrangement 12; the remote end of one limb 11a of the U is adapted to receive and support a saddle stem 15 and also to provide an anchorage 16 for the upper end (not shown) of part of the rear fork arrangement for the support of the rear wheel; and the other limb 11b is adapted to receive the head tube 13 for the front work.

In order to locate the head tube 13, an elongated hole 17 is drilled in the cylindrical surface of the main frame element 11, the disposition and dimensions of said hole 17 being such that it will allow passage therethrough of the head tube 13 in such manner that said tube may lie in coaxial engagement with the main frame element 11, the upper end face 13a of the head tube 13 being co-planar with the open end of the main frame element 11 when the tube is in position.

The extreme end portion 11b' of the main frame element 11 by which the head tube 13 is supported is of lesser cross sectional dimensions than the remainder of the element, being swaged to an internal diameter equal to or slightly less than the outside diameter of the head tube. The head tube 13 is secured to the main frame element 11 by brazing at both the upper end, where the head tube and frame element together form a double thickness part of the cycle frame, and around the periphery of the elongated hole 17.

A bearing is provided at each end of the head tube and a fork tube and handlebar stem located in the head tube in conventional manner.

In a bicycle or tricycle frame constructed according to the present invention the joint between the head tube 13 and the main frame element 11 will be such as to withstand stresses applied thereto during the use of the bicycle, the strength of jointing between the two parts being dependent upon the area of contact at the end of the main frame element, and at the elongated hole.

The invention is not restricted to the particular features of the embodiments hereinbefore described, since alternatives will readily present themselves to one skilled in the art.

For example, the head tube may protrude beyond the end face of the main frame element, said element having the end thereof swaged to such smaller internal diameter as to approach or contact the cylindrical surface of the head tube, being joined thereto by brazing or welding.

Further, spot or tack welding may be used for the jointing of the main frame element and the head tube at the remote end portion and at the elongated hole respectively.

As an alternative to milling the elongated hole, by conventional methods using a milling tool said hole may be punched out. In these latter circumstances the hole may be formed with a peripheral flange, such flange increasing the contact area between the head tube and the main frame element in the region of the hole.

I claim:

1. A tubular frame for velocipedes comprising a tubular arcuate main frame having an elongated hole therein, an additional tubular frame of smaller external diameter than the inner diameter of said main frame, said additional frame extending through said hole substantially in alinement with an end portion of said arcuate main frame, the latter having a reduced diameter remote from said hole, said reduced portion closely fitted to said additional frame, said frames being united at said hole and to said reduced portion.

2. A frame according to claim 1 characterized in that there is provided a peripheral flange about said hole, the frames being units at said flange.

3. A tubular frame for velocipedes comprising a tubular arcuate main frame, one end of said frame being substantially straight, the diameter of said end being less than that of said arcuate portion, an elliptical hole in said arcuate portion in alinement with said straight end, the projection of the inner periphery of said hole substantially coinciding with the inner periphery of said straight end, an additional frame of smaller external diameter than the internal diameter of said arcuate portion, said additional frame having a substantial straight portion within said main frame, one end of said additional frame in close contact with said main frame end and an intermediate portion of said additional frame in close contact with said hole, said frames being united at said straight end and said hole.

4. A tubular frame for velocipedes comprising a tubular arcuate main frame, one end of said frame being substantially straight, an elliptical hole in said arcuate portion in alinement with said straight end, the projection of the inner periphery of said hole substantially coinciding with the inner periphery of said straight end, an additional frame of smaller external diameter than the internal diameter of said arcuate portion, said additional frame having a substantial straight portion within said main frame, one end of said additional frame in close contact with said main frame end and an intermediate portion of said additional frame in close contact with said hole, said frames being united at said straight end and said hole.

References Cited in the file of this patent

UNITED STATES PATENTS 2,561,710     Pawsat _____ July 24, 1951

FOREIGN PATENTS 336,280     Switzerland _____ Mar. 31, 1959
1,018,329    Germany _____ Oct. 24, 1957
534,657     Belgium _____ Jan. 31, 1955